(12) United States Patent
Shibayama et al.

(10) Patent No.: US 6,433,130 B1
(45) Date of Patent: Aug. 13, 2002

(54) PROCESS FOR PREPARING POLYMER BY USING COPPER COMPOUND

(75) Inventors: Koichi Shibayama, Otsu; Masao Ogasa, Takatsuki, both of (JP)

(73) Assignee: Sekisui Chemical Co., Ltd., Osaka (JP)

( * ) Notice: Subject to any disclaimer, the term of this patent is extended or adjusted under 35 U.S.C. 154(b) by 0 days.

(21) Appl. No.: 09/780,340

(22) Filed: Feb. 12, 2001

Related U.S. Application Data

(63) Continuation-in-part of application No. 09/355,528, filed on Sep. 23, 1999, now abandoned.

(51) Int. Cl.[7] ............................ C08F 6/08; C08G 63/08; C08J 3/00
(52) U.S. Cl. ...................... 528/354; 528/357; 528/485; 528/492; 526/154; 526/164; 502/165
(58) Field of Search .............................. 128/354, 357, 128/485, 492; 526/154, 164; 502/165

(56) References Cited

U.S. PATENT DOCUMENTS 3,980,662 A * 9/1976 Watanabe et al. ..... 260/295.5 A
5,328,970 A * 7/1994 Inoue et al. ................. 526/161

FOREIGN PATENT DOCUMENTS

| JP | 2000-63413 | 2/2000 |
| JP | 2000-103805 | 4/2000 |

* cited by examiner

*Primary Examiner*—Duc Truong
(74) *Attorney, Agent, or Firm*—Connolly Bove Lodge & Hutz LLP

(57) ABSTRACT

The present inventors has its objects to provide a polymerization catalyst component, a copper compound which can easily be synthesized and is stable.

The present invention is related to a method of producing a polymer which comprises using a copper compound represented by the general formula $CuX_n$, $LCuX_n$ or $L(L')C_nX_n$ (wherein L and L' each represents a ligand, X represents a halogen atom or an alkoxy, thioxy, allyloxy, amino, secondary amino, tertiary amino, cyano, nitro, alkyl or allyl group, and n represents an integer of 0 to 2) as a catalyst and/or polymerization initiator in polymerizing a vinyl monomer whose polarity value e, when expressed in terms of absolute value, is not more than 1.5.

19 Claims, No Drawings

PROCESS FOR PREPARING POLYMER BY USING COPPER COMPOUND

CROSS-REFERENCE TO RELATED APPLICATIONS

This is a continuation-in-part of Ser. No. 09/355,528 filed Sep. 23, 1999 now abandoned.

TECHNICAL FIELD

The present invention relates to a method of producing a polymer using a copper compound.

PRIOR ART

A poly-α-substituted olefin derived from an α-substituted olefin of the general formula $CH_2=CY^1E$ (wherein $Y^1$ represents a phenyl or substituted phenyl group and E represents a hydrogen atom or an alkyl group) by polymerization has so far been produced by various methods. Industrially, it is produced by adding a radical generator to a monomer and carrying out radical polymerization. However, the polymer produced by this method has a fairly broad molecular weight distribution and, because of inclusion of a low-molecular-weight polymer, it is poor in heat resistance.

On experimental scale, it can be obtained also by anionic polymerization, cationic polymerization or group transfer polymerization, for instance. Recently, a method of producing a highly stereoregular poly-α-substituted olefin has been proposed and has attracted attention which comprises polymerizing an α-substituted olefin of the general formula $CH_2=CY^2H$ (wherein $Y^2$ represents a phenyl or substituted phenyl group) using, as a polymerization catalyst component, a transition metal complex alone or a combination of a transition metal complex and an organoaluminum compound [Nobuhide Ishihara et al.: The Society of Polymer Science, Japan, Preprints, 35, 240 (1986); Japanese Kokai Publication Hei-03-72504].

A poly-α-substituted olefin derived from an α-substituted olefin of the general formula $CH_2=CY^3Z$ (wherein $Y^3$ represents a cyano group and Z represents a hydrogen atom or an alkyl group) by polymerization has so far been produced by various methods. Industrially, it is produced by radical polymerization with a radical generator added to a monomer.

As a method of polymerization by which the molecular weight and molecular weight distribution can be controlled, there have been proposed, on the laboratory level, anionic polymerization, coordination polymerization and group transfer polymerization, for instance. To be concrete, a highly stereoregular poly-α-substituted olefin was produced from a monomer of the general formula $CH_2=CHY^3$ (wherein $Y^3$ represents a cyano group) by a production method using an aluminum compound and a transition metal compound as polymerization catalysts (Japanese Kokai Publication Hei-01-79206) and a precision polymer having a narrow molecular weight distribution was produced by a polymerization reaction using an organic rare earth metal complex as a catalyst component [Akira Nakamura et al.: 43rd Meeting of The Society of Polymer Science, Japan (May 26, 1994), II-3-08].

Recently, a lactone polymer has attracted attention as biodegradable plastics.

As regards the polymerization of a lactone, anionic polymerization, coordination polymerization and group transfer polymerization, among others, have been proposed, on the laboratory level, as a polymerization method capable of controlling the molecular weight and molecular weight distribution. More specifically, there may be mentioned the method comprising carrying out polymerization using an aluminum-porphyrin complex as a polymerization initiator [Macromolecules, 14, 166 (1981)] and the method comprising using an aluminum-porphyrin complex and a Lewis acid having a bulky substituent as a polymerization initiator (Japanese Kokai Publication Hei-04-323204), among others.

A vinyl monomer has so far been polymerized by various methods. Most of the methods employed in industry comprise adding a radical generator to a vinyl monomer and carrying out radical polymerization under high temperature and high pressure conditions. Recently, anionic polymerization, coordination polymerization and group transfer polymerization, for instance, have been proposed, on the laboratory level, as polymerization methods by which the molecular weight and molecular weight distribution can be controlled.

However, the compounds used in such catalyst systems are generally unstable against oxygen and/or moisture and readily decomposable and, further, require a number of reaction steps for their synthesis. In addition, their instability makes their synthesis difficult, leading to low yields and, as a result, they constitute expensive catalyst systems.

On the other hand, as for the metal in the transition metal complex used in the catalyst systems, titanium, zirconium, hafnium and the like, which are group IV transition elements, hence early transition metals, are generally used. Recently, nickel, palladium and the like, which are group X transition elements, hence late transition metals, have also been used in spite of their rather decreased reactivity [e g. JACS, 117 (23), 6414 (1995)].

The complex containing copper as the nucleus has an advantage in that it has good stability and can be synthesized with ease. Because of its low activity due to its stability, however, it has never been studied as a polymerization catalyst. Only recently, the present inventors found and reported that a copper complex can be used as a catalyst for polymerization of carbodiimide, which is a highly polar monomer, to give a living polymer [Macromolecules, 30, 3159 (1997)].

However, a copper complex has never been applied as a polymerization catalyst for a monomer of relatively low polarity which requires reactivity.

SUMMARY OF THE INVENTION

The object of the present invention is to provide a method of producing a polymer using, as a polymerization catalyst, a copper compound which can easily be synthesized and is stable.

The present inventors have succeeded in solving the problems discussed above by using, as a polymerization catalyst component, a copper compound which can easily be synthesized and is stable.

The method of producing a polymer using a copper compound in accordance with a first aspect of the present invention (hereinafter referred to as "first invention") comprises using a copper compound represented by the general formula CuXn, LCuXn or L(L')CuXn (wherein L and L' each represents a ligand, X represents a halogen atom or an alkoxy, thioxy, allyloxy, amino, secondary amino, tertiary amino, cyano, nitro, alkyl or allyl group, and n represents an integer of 0 to 2) as a catalyst and/or polymerization initiator in polymerizing a vinyl monomer whose polarity value e, when expressed in terms of absolute value, is not more than 1.5.

Preferably, the method of producing a polymer comprises using a copper compound represented by the general formula LCuXna or L(L')CuXnb (wherein L and L' each represents a N-coordination compound selected from the group consisting of bisoxazoline, substituted bisoxazoline, an amidinato compound and a diimine represented by the general formula $R^3N=CR^4CR^5=NR^6$ (wherein $R^3$, $R^4$, $R^5$ and $R^6$ each represents independently an alkyl, allyl, an aryl, a hydrogen atom, or a halogen atom; or at least one group of $R^3$ and $R^4$, $R^4$ and $R^5$, and $R^5$ and $R^6$ is combined and represents a cyclic group with the next carbon and/or nitrogen atom), or a O- and N-coordination compound; X represents a halogen atom or an alkoxy, thioxy, allyloxy, amino, secondary amino, tertiary amino, cyano, nitro, alkyl or allyl group; na represents an integer of 1 to 2; and nb represents an integer of 0 to 2) as a catalyst and/or polymerization initiator in polymerizing a vinyl monomer whose polarity value e, when expressed in terms of absolute value, is not more than 1.5.

The method of producing a polymer using a copper compound in accordance with a second aspect of the present invention (hereinafter referred to as "second invention") comprises using a copper compound represented by the general formula CuXn, LCuXn or L(L')CuXn (wherein L and L' each represents a ligand, X represents a halogen atom or an alkoxy, thioxy, allyloxy, amino, secondary amino, tertiary amino, cyano, nitro, alkyl or allyl group, and n represents an integer of 0 to 2) as a catalyst and/or polymerization initiator in polymerizing a compound capable of polymerizing by a ring-opening reaction.

Preferably, the method of producing a polymer comprises using a copper compound represented by the general formula LCuXna or L(L')CuXnb (wherein L and L' each represents a N-coordination compound selected from the group consisting of bisoxazoline, substituted bisoxazoline, an amidinato compound and a diimine represented by the general formula $R^3N=CR^4CR^5=NR^6$ (wherein $R^3$, $R^4$, $R^5$ and $R^6$ each represents independently an alkyl, allyl, an aryl, a hydrogen atom, or a halogen atom; or at least one group of $R^3$ and $R^4$, $R^4$ and $R^5$, and $R^5$ and $R^6$ is combined and represents a cyclic group with the next carbon and/or nitrogen atom), or a O- and N-coordination compound; X represents a halogen atom or an alkoxy, thioxy, allyloxy, amino, secondary amino, tertiary amino, cyano, nitro, alkyl or allyl group; na represents an integer of 1 to 2; and nb represents an integer of 0 to 2) as a catalyst and/or polymerization initiator in polymerizing a compound capable of polymerizing by a ring-opening reaction.

The method of producing a polymer using a copper compound in accordance with a third aspect of the present invention (hereinafter referred to as "third invention") comprises using the copper compound together with one or more organometallic compounds selected from the group consisting of aluminoxanes, organoaluminum compounds represented by the general formula $AlR_mZ_{3-m}$ (wherein R represents a hydrocarbon group containing 1 to 20 carbon atoms, Z represents a hydrogen or halogen atom or an alkoxy, allyloxy or siloxy group, and m is an integer of 0 to 3), boron-containing Lewis acids and boron-containing ionic compounds in the first or second invention.

DETAILED DESCRIPTION OF THE INVENTION

In the following, the present invention is described in detail.

The vinyl monomer to be used in the present invention includes those which have a reactive double bond within the molecule and whose polarity value e, when expressed in terms of absolute value, is not more than 1.5.

The above-mentioned polarity value e is a value indicating the electron density at a double bond site. When there is an electron flow into the double bond, the polarity shows a negative value and, when an electron is being pulled by a substituent, it shows a positive value [Kobunshi Kagaku no Kiso; edited by The Society of Polymer Science, Japan, published by Tokyo Kagaku Dojin).

When the above polarity value e exceeds 1.5, the vinyl monomer is excessively high in polarity, so that the copper complex catalyst, in particular in a system in which an organometallic compound is used as a promoter, is deactivated and the polymerization reaction can no longer proceed successfully.

As the vinyl monomer whose polarity value e is not more than 1.5 in absolute value, there may be mentioned, for example, olefins; α-substituted olefins; (meth)acrylic esters; and monomers having a carbon-nitrogen double bond or a carbon-nitrogen triple bond. These may be used singly or two or more of them may be used in combination or copolymerized. In the case of copolymerization, random copolymerization and block copolymerization are both possible.

Said olefin has at least one carbon-carbon double bond within the molecule. Examples are such α-olefins as ethylene, propylene, 1-butene, 1-pentene, 1-hexene, 1-heptene, 1-octene and 4-methyl-1-pentene; and dienes such as butadiene.

The α-substituted olefin mentioned above may be represented by the general formula $CH_2=CY^1E$ (wherein $Y^1$ represents a phenyl or substituted phenyl or cyano group and E represents a hydrogen atom or an alkyl group) and, as examples, there may be mentioned styrene, α-methylstyrene, α-ethylstyrene, o-methylstyrene, p-methylstyrene, o-chlorostyrene, p-chlorostyrene, o-bromostyrene, p-bromostyrene, p-nitrostyrene, o-methoxystyrene, p-methoxystyrene, acrylonitrile, methacrylonitrile and the like.

Among said (meth)acrylic esters, those of the general formula $CH_2=C(R^1)COOR^2$ [wherein $R^1$ is a hydrogen atom or a methyl group (in the case of acrylic esters, it is a hydrogen atom and, in the case of methacrylic esters, it is a methyl group) and $R^2$ is a univalent group selected from among aliphatic hydrocarbon groups, aromatic hydrocarbon groups, and hydrocarbon groups containing a functional group such as halogen, amine or ether] may be used efficiently. Specific examples include, but are not limited to, methyl (meth) acrylate, ethyl (meth)acrylate, n-propyl (meth)acrylate, isopropyl (meth)acrylate, n-butyl (meth)acrylate, isobutyl (meth)acrylate, sec-butyl (meth)acrylate, t-butyl (meth)acrylate, isoamyl (meth)acrylate, n-hexyl (meth)acrylate, cyclohexyl (meth)acrylate, 2-ethylhexyl (meth)acrylate, n-octyl (meth)acrylate, lauryl (meth) acrylate, n-tridecyl (meth)acrylate, myristyl (meth)acrylate, cetyl (meth)acrylate, stearyl (meth)acrylate, allyl (meth) acrylate, vinyl (meth)acrylate, benzyl (meth)acrylate, phenyl (meth)acrylate, 2-naphthyl (meth)acrylate, 2,4,6-trichlorophenyl (meth)acrylate, 2,4,6-tribromophenyl (meth)acrylate, isobornyl (meth)acrylate, 2-methoxyethyl (meth)acrylate, 2-ethoxyethyl (meth)acrylate, diethylene glycol monomethyl ether (meth)acrylate, polyethylene glycol monomethyl ether (meth)acrylate, polypropylene glycol monomethyl ether (meth)acrylate, tetrahydrofurufuryl (meth)acrylate, 2,3-dibromopropyl (meth)acrylate, 2-chloroethyl (meth)acrylate, 2,2,2-trifluoroethyl (meth)

acrylate, hexafluoroisopropyl (meth)acrylate, glycidyl (meth)acrylate, 3-trimethoxysilylpropyl (meth)acrylate, 2-diethylaminoethyl (meth)acrylate, 2-dimethylaminoethyl (meth)acrylate, t-butylaminoethyl (meth)acrylate, and the like.

The above-mentioned monomer containing a carbon-nitrogen double bond or a carbon-nitrogen triple bond is, for example, alkyl isocyanates and alkyl isocyanides.

As the above-mentioned compound capable of polymerizing through a ring-opening reaction, there may be mentioned cyclic ester compounds, cyclic epoxide compounds and the like and, more specifically, lactone compounds such as β-propiolactone, α-methyl-β-propiolactone, α, α'-dimethyl-β-propiolactone, α-vinyl-β-propiolactone, γ-butyrolactone, δ-valerolactone and ε-caprolactone, and propylene oxide. These may be used singly or two or more of them may be used in combination.

For obtaining a polymer from the above-mentioned vinyl monomer or the compound capable of polymerizing through a ring-opening reaction in the production method of the present invention, a copper compound is used as a catalyst either alone or incombination with an organometallic compound.

Said copper compound is represented by the general formula CuXn, LCuXn or L(L')CuXn, preferably, by the general formula LCuXna or L(L')CuXnb.

In the above formulas, L and L' each represents a ligand and X represents a halogen atom or an alkoxy, thioxy, allyloxy, amino, secondary amino, tertiary amino, cyano, nitro, alkyl or allyl group, preferably a halogen atom such as chlorine or bromine; an alkoxy group such as methoxy, ethoxy, isopropoxy or t-butoxy; or a tertiary amino group such as dimethylamino or diethylamino n is an integer of 0 to 2. na is an integer of 1 to 2. nb is an integer of 0 to 2.

The ligands L and L' are not particularly restricted but may be involved in coordinate bonding through the unpaired electron of an N, S, O or P atom occurring in the ligand structure or through a cyclopentadienyl group. More specifically, mention may be made of N-coordination, such as coordination with an amine, secondary alkylamine, tertiary alkylamine or an diimine, or amidinato coordination; and O-coordination such as coordination with an alkoxy or aryloxy group, among others.

As the N-coordination compound, there may be mentioned, for example, bipyridine, substituted bipyridine, bisoxazoline, substitued bisoxaline; diimines represented by the general formula $R^3N=CR^4CR^5=NR^6$ (wherein $R^3$, $R^4$, $R^5$ and $R^6$ each represents independently an alkyl, allyl, an aryl, a hydrogen atom, or a halogen atom; or at least one group of $R^3$ and $R^4$, $R^4$ and $R^5$, and $R^5$ and $R^6$ is combined and represents a cyclic group with the next carbon and/or nitrogen atom); and amidine compounds exemplified by N,N'-di-substituted amidine such as N,N'-dimethylamidine, N,N'-diethylamidine, N,N'-diisopropylamidine, N,N'-di-t-butylamidine, N,N'-ditrifluoromethylamidine, N,N'-di-substituted phenylamidine and N,N'-ditrimethylsilylamidine, N,N,'-di-substituted benzamidine such as N,N'-dimethylbenzamidine, N,N'-diethylbenzamidine, N,N'-diisopropylbenzamidine, N,N'-di-t-butylbenzamidine, N,N'-ditrifluoromethylbenzamidine, N,N'-diphenylbenzamidine, N,N'-ditrimethylsilylbenzamidine and N,N'-di-substituted phenylbenzamidine.

In the general formula $R^3N=CR^4CR^5=NR^6$ of the diimine, the alkyl of $R^3$, $R^4$, $R^5$ and $R^6$ is exemplified by an alkyl having 1 to 6 carbon atoms such as methyl, ethyl, n-propyl, isopropyl, n-butyl, t-butyl, pentyl, and hexyl. The aryl is exemplified by phenyl, biphenyl, and the like. The above alkyl, allyl, and aryl may be substituted by alkyl having 1 to 4 carbon atoms such as methyl, ethyl, n-propyl, isopropyl, n-butyl, and t-butyl; alkoxy, and the like. The halogen atom is exemplified by fluorine, chlorine, bromine, and iodine. The cyclic group is, for example, a cyclic hydrocarbon by combining $R^4$ and $R^5$ with the next carbon atoms and a heterocycle by combining $R^4$ and $R^4$, or $R^5$ and $R^6$ with the next carbon and nitrogen atoms. The cyclic hydrocarbon is exemplified by mono- di- or tri-cyclic hydrocarbon having 4-, 5- or 6-membered ring as each ring, and the like. The heterocycle is exemplified by mono-, di- or tri-heterocycle having 4-, 5- or 6-membered ring as each ring, and the like. A part of carbon atoms of the cyclic group may be substituted by at least one or nitrogen atom(s), sulfur atom(s), oxygen atom(s), and silicon atom(s).

The diimine of the general formula $R^3N=CR^4CR^5=NR^6$ (wherein each $R^3$ and $R^6$ is an aryl, each $R^4$ and $R^5$ is a hydrogen atom, a halogen atom, an alkyl, allyl, or an aryl; or $R^4$ and $R^5$ are combined and represents a cyclic hydrocarbon with the next carbon atoms) is preferable. The diimine of the above general formula, wherein each $R^3$ and $R^6$ is an aryl and $R^4$ and $R^5$ are combined and represents a cyclic hydrocarbon with the next carbon atoms, is more preferable. Particularly, each $R^3$ and $R^6$ is preferable to be a phenyl substituted by alkyl having 1 to 4 carbon atoms such as methyl, ethyl, n-propyl, isopropyl, n-butyl, and t-butyl on its o- and/or m-position(s).

As the O-coordination compound with an alkoxy or aryloxy group, the O-coordination compound which coordinates with both O and N atoms of the compound at the same time, namely the O- and N-coordination compound, is preferable. As the O- and N-coordination compound, there may be mentioned, for example, 8-quinolinol, and the 8-quinolinol may be substituted.

The copper compound mentioned above may occur as the dimer or trimer or binuclear complex of a compound of the general formula CuXn, LCuXn or L(L')CuXn, preferably of the general formula LCuXna or L(L')CuXnb, which contains two or more copper atoms per molecule.

In many instances, these complexes occur in the monomer form in the solution or in the monomer at the time of reaction, although they occur as dimers, trimers or binuclear complexes in their solid state. They can be used in the present invention if said monomer state corresponds to the general formula CuXn, LCuXn or L(L')CuXn, preferably the general formula LCuXna or L(L')CuXnb.

The above copper compound can be synthesized in an easy and simple manner from an inexpensive copper halide, for example copper chloride. When the synthesis of copper (II) amidinato complexes, namely the N-coordination compounds mentioned above, is taken as an example, they can be synthesized, for example, by adding an equivalent amount of an amidine compound to anhydrous copper(II) chloride and stirring the mixture in a dry organic solvent at ordinary temperature for several hours.

In many instances, the copper compound thus synthesized is relatively stable against oxygen and moisture. In particular, bivalent copper complexes, such as N,N'-dimethylbenzamidinato-copper(II) complex, can remain stable even in 100% dry oxygen, while the corresponding titanium complexes are decomposed in an atmosphere containing oxygen at a concentration of about 1%. Therefore, they can be handled very easily as compared with transition metal compounds such as titanium and zirconium compounds.

The above copper compound may be used singly or two or more of them may be used in combination.

It may be used also in a form diluted with a hydrocarbon or a halogenated hydrocarbon or the like.

The above copper compound may be used in a form supported on a granular carrier.

Useful as the granular carrier is, for example, an inorganic carrier such as $SiO_2$, $Al_2O_3$, MgO, CaO, $TiO_2$, ZnO and $MgCl_2$; and a resin such as polyethylene, polypropylene and styrene-divinylbenzene copolymers.

Suitable as the organometallic compound to be used in combination with the copper compound is at least one member selected from the group consisting of aluminoxane, organoaluminum compounds represented by the general formula $AlR_mZ_{3-m}$ (wherein R represents a hydrocarbon group containing 1 to 20 carbon atoms, Z represents a hydrogen or halogen atom or an alkoxy, allyloxy or siloxy group, and m is an integer of 0 to 3), boron-containing Lewis acids and boron-containing ionic compounds.

Among the above organometallic compounds, aluminoxanes are compounds represented by the general formula $R^1(Al(R^1)\text{—}O)_pAlR^1_2$ or the general formula (1) given below.

In each formula, $R^1$ represents a hydrocarbon group containing 1 to 3 carbon atoms, and p represents an integer not less than 2.

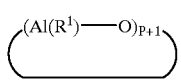

(1)

Among the above aluminoxane, methylaluminoxane in which $R^1$ is a methyl group and p is not less than 5 are preferred, and those in which p is not less than 10 are more preferred. Such aluminoxanes are commercially available generally in the form of toluene solutions.

As regards the method of producing them, the direct reaction of trialkylaluminums with water and the reaction with metal salt hydrates are known.

As the organoaluminum compound represented by the above general formula $AlR_mZ_{3-m}$, there may be mentioned various species. More specifically, there may be mentioned trialkylaluminums such as trimethylaluminum, triethylaluminum, truisopropylaluminum, triisobutylaluminum and trioctylaluminum; alkenylaluminums such as isoprenylaluminum; dialkylaluminum monochlorides such as dimethylaluminum chloride, diethylaluminum chloride, diisopropylaluminum chloride, diisobutylaluminum chloride and dioctylaluminum chloride; alkylaluminum sesquichloride such as methylaluminum sesquichloride, ethylaluminum sesquichloride, isopropylaluminum sesquichloride, isobutylaluminum sesquichloride and octylaluminum sesquichloride; alkylalminum dichlorides such as methylaluminum dichloride, ethylaluminum dichloride, isopropylaluminum dichloride, isobutylaluminum dichloride and octylaluminum dichloride; alkoxy group-containing aluminum compounds such as methoxydiethylaluminum, diisopropoxymethylaluminum and triisopropoxyaluminum; and so forth.

As the boron-containing Lewis acid among the above organometallic compounds, there may be mentioned compounds represented by the general formula $BR^2_3$ wherein $R^2$ represents a phenyl group, which may optionally have a substituent such as a fluorine atom, a methyl group, a trifluoromethyl group or the like, or represents a fluorine atom. Specific examples are trifluoroboron, triphenylboron, tris(4-fluorophenyl)boron, tris(3,5-difluorophenyl)boron, tris(4-fluoromethylphenyl)boron, tris(pentafluorophenyl) boron, tris(p-tolyl)boron, tris(o-tolyl)boron, and tris(3,5-dimethylphenyl)boron. Among these, tris (pentafluorophenyl)boron is preferred.

As the boron-containing ionic compound among the above organometallic compounds, there may be mentioned, for example, trialkyl-substituted ammonium salts, N,N-dialkylanilinium salts, dialkylammonium salts and triarylphosphonium salts.

As specific examples, there may be mentioned trialkyl-substituted ammonium salts such as triethylammonium tetra (phenyl)boron, tripropylammonium tetra(phenyl)boron, tri (n-butyl)ammonium tetra(phenyl)boron, trimethylammonium tetra(p-tolyl)boron, trimethylammonium tetra(o-tolyl)boron, tributylammonium tetra (pentafluorophenyl)boron, tripropylammonium tetra(o,p-dimethylphenyl)boron, tributylammonium tetra(m,m-dimethylphenyl)boron, tributylammonium tetra(p-trifluoromethylphenyl)boron and tri(n-butyl)ammonium tetra(o-tolyl)boron; N,N-dialkylanilinium salts such as N,N-dimethylanilinium tetra(phenyl)boron, N,N-diethylanilinium tetra(phenyl)boron and N,N,2,4,6-pentamethylanilinium tetra(phenyl)boron; dialkylammonium salts such as di(1-propyl)ammonium tetrapentafluorophenylboron and dicyclohexylammonium tetra (phenyl)boron; triarylphosphonium salts such as triphenylphosphonium tetra(phenyl)boron and tri (dimethylphenyl)phosphonium tetra(phenyl)boron; and the like. Further examples are triphenylcarbenium tetrakis (pentafluorophenyl)boronate, N,N-dimethylanilinium tetrakis(pentafluorophenyl)borate, ferrocenium tetra (pentafluorophenyl)borate and the like.

Further, such anion salts as listed below may also be mentioned as examples of the boron-containing ionic compounds [in the ionic compounds listed below, the counter ion is typically given as, but is not limited to, tri(n-butyl) ammonium]. Such salts of anions include, for example, bis[tri(n-butyl)ammonium] nonaborate, bis[tri(n-butyl) ammonium] decaborate, bis[tri(n-butyl)ammonium] undecaborate, bis[tri(n-butyl)ammonium] dodecaborate, bis [tri(n-butyl)ammonium] decachlorodecaborate, bis[tri(n-butyl)ammonium] dodecachlorododecaborate, tri(n-butyl)-ammonium 1-carbadecaborate, tri(n-butyl)ammonium 1-carbaundecaborate, tri(n-butyl)ammonium 1-carbadodecaborate, tri(n-butyl)ammonium 1-trimethylsilyl-1-carbadecaborate, tri(n-butyl)ammonium bromo-1-carbadodecaborate and, further, borane and carborane complexes; carborane anion salts; carboranes and carborane salts, for instance.

Furthermore, such metal carborane salts and metal borane anions as listed below may also be mentioned as examples of said boron-containing ionic compound [in the ionic compounds listed below, the counter ion is typically given as, but is not limited to, tri(n-butyl)ammonium].

Said metal carborane salt and metal borane anion include, among others, tri(n-butyl)ammonium bis(nonahydrido-1,3-dicarbanonaborate) cobaltate(III), tri(n-butyl)ammonium bis(undecahydrido-7,8-dicarbaundecaborate) ferrate(III), tri (n-butyl)ammonium bis(undecahydrido-7,8-dicarbaundecaborate) cobaltate(III), tri(n-butyl)ammonium bis(undecahydrido-7,8-dicarbaundecaborate) nickelate(III), tri(n-butyl)ammonium bis(undecahydrido-7,8-dicarbaundecaborate) cuprate(III), and the like.

In the catalyst system in the present invention, there may be incorporated, when necessary, an electron-donating compound such as ethyl benzoate. The addition of such a compound may sometimes lead to a marked increase in polymerizing activity.

The details of the polymerization mechanisms in the production method of the present invention are not clear. It is presumable, however, that the copper compound serves as a catalyst and/or polymerization initiator and that the interaction between the copper compound alone or the copper compound and organometallic compound, on one hand, and the vinyl monomer or the compound capable of polymerizing through a ring-opening reaction (hereinafter, collectively referred to as "monomer") on the other accelerates the coordination and insertion reactions of the monomer.

The above copper compound alone or the copper compound and organometallic compound may be added to the reaction system before, simultaneously with, or after monomer introduction, but preferably before monomer introduction. The polymerization technique and conditions, among others, are not particularly restricted. The polymerization may be carried out continuously or noncontinuously.

The polymerization for obtaining the above polymers is preferably carried out in an inert gas atmosphere. Useful as said inert gas are nitrogen, helium and argon, among others.

The solvent to be used in the polymerization includes, among others, halogenated hydrocarbons such as methylene chloride, chloroform, carbon tetrachloride and dichloroethane; hydrocarbons such as benzene, toluene and xylene; tetrahydrofuran, dioxane, dimethylformamide and the like. It is also possible to carry out the polymerization without using any solvent.

The polymerization temperature is preferably within the range from the melting point of the solvent used to the boiling point thereof. If under pressurization, the polymerization can be carried out within a wider temperature range extending to a higher temperature than the boiling point at ordinary pressure.

For example, even at room temperature, polymers with a narrow molecular weight distribution can be obtained.

To be concrete, it is generally preferred that the polymerization temperature be $-20°$ C. to $200°$ C., more preferably $0°$ C. to $120°$ C. As for the polymerization pressure, it is generally preferred that it be within the range of atmospheric pressure to 100 kg/cm$^2$, more preferably from atmospheric pressure to 50 kg/cm$^2$.

In cases where the copper compound is used alone as the catalyst, it is generally preferred that it be used in an amount of about 0.00005 to 0.5 millimole, more preferably about 0.0001 to 0.05 millimole, as calculated on the copper atom basis, per liter of polymerization volume.

In cases where the copper compound and organometallic compound are combinedly used as the catalyst, the copper compound is preferably used in the same amount as in the case of single use of the copper compound and, as regards the organometallic compound, it is generally preferred that when it is an aluminum compound, it be used in an amount of about 1 to 10,000 moles, more preferably 10 to 5,000 moles, as calculated on the aluminum atom basis, per mole of the copper atom in the copper compound. In the case of a boron-containing Lewis acid or ionic compound, it is generally preferred that it be used in an amount of 1 to 500 moles, more preferably 1 to 100 moles, as calculated on the boron atom basis, per mole of the copper atom in said copper compound.

The molecular weight of the product polymer can be controlled by modifying the polymerization temperature and other conditions or by other known means, for example the use of hydrogen.

By using such a polymerization catalyst as mentioned above, it is possible to obtain polymers excellent in composition distribution in the same manner as in the case of using other transition metal complex catalysts. Actually, it can be confirmed by polymer analysis by gel permeation chromatography (GPC) that the polymers obtained by the production method of the present invention have a molecular weight distribution (Mw/Mn) as narrow as 1.1 to 3.5, indicating the progress of polymerization in a precisely controlled manner.

BEST MODES FOR CARRYING OUT THE INVENTION

The following examples illustrate the present invention in further detail. However, these examples are by no means limitative of the scope of the present invention.

EXAMPLE 1

(1) Synthesis of Copper Compounds

In the following, unless otherwise specified, dried and distilled reagents were used.

Synthesis of N,N'-ditrimethylsilylbenzamidinecopper(II) compound

① Synthesis of N,N,N'-tris(trimethylsilyl)benzamidine

A fully argon-substituted 250-ml Schlenk flask was charged with 40 ml of tetrahydrofuran and cooled to $-78°$ C. To this flask was added 10 ml of 1,1,1,3,3,3-hexamethyldisilazane, and 30.5 ml of a commercial 1.6 M n-butyllithium solution in hexane was added dropwise over 20 minutes. After 30 minutes of stirring, 4.9 ml of benzonitrile was added dropwise over 10 minutes.

Then, the temperature of the system was returned to ordinary temperature, then stirring was performed for 10 hours, the solvent was then distilled off under reduced pressure, 50 ml of toluene was added to the solid remaining in the flask, and 12.2 ml of trimethylsilyl chloride was added dropwise. Further, the flask was equipped with a condenser, the mixture was heated under reflux for 10 hours and then filtered, and the solvent was distilled off from the filtrate under reduced pressure to give the desired product. The desired product was purified by vacuum distillation, whereupon 11 g of N,N,N'-tris(trimethylsilyl)benzamidine was obtained as white crystals.

2 Synthesis of an N,N'-ditrimethylsilylbenzamidinecopper (II) compound

A fully argon-substituted 50-ml Schlenk flask was charged with 1.3 g of the N,N,N'-tris(trimethylsilyl) benzamidine prepared as mentioned above in ① and 0.28 g of anhydrous copper chloride, and 15 ml of anhydrous acetonitrile (product of Wako Pure Chemical Industries) was then added to give a homogeneous solution. After the lapse of 15 hours, the solution was filtered, the solvent was distilled off from the filtrate under reduced pressure to give the desired product. The desired product was recrystallized from a tetrahydrofuran/n-hexane mixed solvent to give 0.65 g of the copper complex [compound represented by the formula (2) given below; in formula (2), TMS represents a trimethylsilyl group] as green crystals. Identification was performed by IR and elemental analysis.

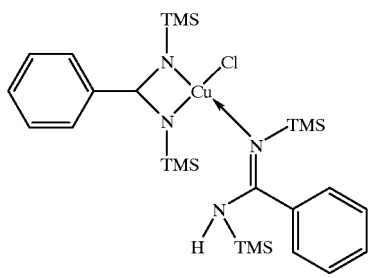

(2) Synthesis of Polyethylene

A 300-ml glass pressure vessel was purged with argon, and then charged with 100 ml of toluene, followed by addition of 12 mg of the N,N'-ditrimethylsilylbenzamidinecopper(II) compound prepared as described above in (1) and 5 ml of a 10% solution of methylaluminoxane (product of Aldrich Chemical) in toluene. Then, while introducing gaseous ethylene into the vessel and maintaining the system inside at 1.1 kg/cm$^2$, the polymerization was carried out at 20°C. for 24 hours. Thereafter, the reaction was terminated by adding 150 ml of methanol to the reaction solution, and the precipitate polymer was recovered, whereupon 1.5 g of polyethylene was obtained.

The polyethylene obtained was subjected to polymer analysis by gel permeation chromatography (GPC) and differential scanning calorimetry (DSC). o-Dichlorobenzene was used as the solvent for GPC. The weight average molecular weight was 820,000 and the number average molecular weight was 405,000, and the ratio of weight average molecular weight to number average molecular weight (Mw/Mn), an index indicating the molecular weight distribution, was thus 2. The melting curve obtained by DSC showed a peak, namely melting temperature, at 138° C. No melting peak was observed at 60° C. or below.

EXAMPLE 2

Two grams (2 g) of polyethylene was obtained under the same conditions as in Example 1 except that 10 ml of a 1 M solution of triisobutylaluminum (product of Aldrich) in toluene was used in lieu of 5 ml of the 10% solution of methylaluminoxane in toluene.

The polyethylene obtained was evaluated in the same manner as in Example 1. The weight average molecular weight was 715,000, the number average molecular weight was 388,000, and the ratio of weight average molecular weight to number average molecular weight (Mw/Mn), an index indicating the molecular weight distribution, was 1.8.

The melting curve obtained by DSC showed a peak, namely melting temperature, at 137° C. Like Example 1, no melting peak was observed at 60° C. or below.

EXAMPLE 3

A 100-ml Schlenk flask was purged with argon and then charged with 20 ml of toluene, followed by addition of 10 mg of the N,N'ditrimethylsilybenzamidinecopper(II) compound prepared in Example 1(1) and 5 ml of a 10% solution of methylaluminoxane (product of Aldrich) in toluene. Then, 1 g of monomeric styrene was introduced into the flask and the polymerization was carried out at 20° C. for 72 hours. The reaction was then terminated by addition of 30 ml of methanol, the catalyst residue was removed, the product was dissolved in chloroform and the solution was poured into an excess of n-hexane. The resulting precipitate polymer was recovered, whereupon 0.39 g of polystyrene was obtained.

The polystyrene obtained was analyzed by gel permeation chromatography (GPC) and nuclear magnetic resonance spectrometry (NMR). Tetrahydrofuran was used as the solvent for GPC. The polystyrene-equivalent weight average molecular weight and number average molecular weight of the polymer obtained were 45,000 and 29,000, respectively, and the ratio of weight average molecular weight to number average molecular weight (Mw/Mn), an index indicating the molecular weight distribution, was 1.55. Stereoregularity analysis by nuclear magnetic resonance spectrometry (NMR) showed isotactic stereoregularity.

EXAMPLE 4

Polystyrene (0.35 g) was obtained under the same conditions as in Example 3 except that 5 ml of a 1 M solution of triisobutylaluminum (product of Aldrich) in toluene was used in lieu of 5 ml of the 10% solution of methylaluminoxane in toluene.

The polystyrene obtained was evaluated by GPC in the same manner as in Example 1. The weight average molecular weight was 52,000, the number average molecular weight was 35,000, and the ratio of weight average molecular weight to number average molecular weight (Mw/Mn), an index indicating the molecular weight distribution, was 1.49.

EXAMPLE 5

A 100-ml Schlenk flask was purged with argon and then charged with 20 ml of toluene, followed by addition of 10 mg of the N,N'-trimethlsilylbenzamidinecopper(II) compound prepared in Example 1 (1) and 5 ml of a 10% solution of methylaluminoxane (product of Aldrich) in toluene. Then, 1.3 g of acrylonitrile was introduced into the flask and the polymerization was carried out at 20° C. for 24 hours. The reaction was then terminated by addition of 30 ml of methanol. The catalyst residue was removed, the reaction product was dissolved in dimethylformamide and the solution was poured into an excess of isopropanol. The resulting precipitate polymer was recovered, whereupon 0.89 g of polyacrylonitrile was obtained.

The polyacrylonitrile obtained was evaluated by GPC in the same manner as in Example 1. Dimethylformamide was used as the solvent for GPC and, for obtaining an exact peak, it was used as a 0.1 M solution of lithium bromide. The polystyrene-equivalent weight average molecular weight and number average molecular weight of the polymer obtained were 155,000 and 102,000, respectively, and the ratio of weight average molecular weight to number average molecular weight (Mw/Mn), an index indicating the molecular weight distribution, was 1.52.

EXAMPLE 6

Polystyrene (0.76 g) was obtained under the same conditions as in Example 5 except that 5 ml of a 1 M solution of triisobutylaluminum (product of Aldrich) in toluene was used in lieu of 5 ml of the 10% solution of methylaluminoxane in toluene.

The polystyrene obtained was evaluated by GPC in the same manner as in Example 1. The weight average molecular weight was 112,000, the number average molecular weight was 81,000, and the ratio of weight average molecular weight to number average molecular weight (Mw/Mn), an index indicating the molecular weight distribution, was 1.38.

EXAMPLE 7

A 100-ml Schlenk flask was purged with argon and then charged with 10 ml of toluene, followed by addition of 30 mg of the N,N'-ditrimethylsilylbenzamidinecopper(II) compound prepared in Example 1 (1) and 2 ml of a 10% solution of methylaluminoxane (product of Aldrich) in toluence. Then, 1.2 g of ε-caprolactone was introduced into the flask and the polymerization was carried out at 30° C. for 24 hours. The reaction was then terminated by addition of 30 ml of methanol. The catalyst residue was removed, the reaction product was dissolved in dimethylformamide and the solution was poured into an excess of isopropanol. The resulting precipitate polymer was recovered, whereupon 1.11 g of poly(ε-caprolactone) was obtained.

The poly(ε-caprolactone) obtained was evaluated by GPC in the same manner as in Example 1. Chloroform was used as the solvent for GPC. The polystyrene-equivalent weight average molecular weight and number average molecular weight of the polymer obtained were 32,600 and 25,200, respectively, and the ratio of weight average molecular weight to number average molecular weight (Mw/Mn), an index indicating the molecular weight distribution, was 1.29.

EXAMPLE 8

A 50-ml Schlenk flask was purged with argon and then charged with 10 ml of toluene, followed by addition of 18.0 mg of the N,N'-ditrimethylsilylbenzamidinecopper(II) compound prepared in Example 1 (1) and 0.5 ml of a 10% solution of methylaluminoxane (produc of Aldrich) in toluene. Then, 1.66 g of propylene oxide was introduced into the flask and the polymerization was carried out at 0° C. for 24 hours. Thereafter, 30 ml of methanol was added to the reaction mixture to thereby terminate the reaction, the catalyst residue was removed, the solvent was distilled off under reduced pressure, the remaining reaction product was added to an excess of n-hexane, and the precipitate polymer was recovered, whereupon 1.42 g of a propylene oxide polymer resulting from ring opening was obtained.

The propylene oxide ring-opening polymer obtained was evaluated by GPC in the same manner as in Example 1. Tetrahydrofuran was used as the solvent for GPC. The polystyrene-equivalent weight average molecular weight and number average molecular weight of the polymer obtained were 249,000 and 140,900, respectively, and the ratio of weight average molecular weight to number average molecular weight (Mw/Mn), an index indicating the molecular weight distribution, was 1.77.

EXAMPLE 9

A 100-ml Schlenk flask was purged with argon and then charged with 20 ml of toluene, followed by addition of 10 mg of a commercial acetylacetonato compound of copper (II) and 2 ml of a 10% solution of methylaluminoxane (product of Aldrich) in toluene. Then, 1.3 g of methyl methacrylate was introduced into the flask and the polymerization was carried out at 30° C. for 24 hours.

Thereafter, 30 ml of methanol was added to the reaction mixture to thereby terminate the reaction, the catalyst residue was removed, the remaining reaction product was dissolved in chloroform, the solution was added to an excess of methanol, and the precipitate polymer was recovered, whereupon 0.86 g of poly(methyl methacrylate) was obtained.

The poly(methyl methacrylate) obtained was evaluated by GPC in the same manner as in Example 1. Tetrahydrofuran was used as the solvent for GPC. The polystyrene-equivalent weight average molecular weight and number average molecular weight of the polymer obtained were 35,000 and 28,500, respectively, and the ratio of weight average molecular weight to number average molecular weight (Mw/Mn), an index indicating the molecular weight distribution, was 1.23.

EXAMPLE 10

(1) Synthesis of a Copper Compound
Synthesis of a Complex of Copper(II) with 2 Molecules of 8-quinolinol Commercial copper acetate (2.63 g) was dissolved in 300 ml of an acetic acid/sodium acetate buffer solution (prepared by blending equal volumes of 0.1 M aqueous solution of acetic acid and 0.1 M aqueous solution of sodium acetate).

To this solution was added 4 g of commercial 8-quinolinol, and the mixture was stirred at ordinary temperature for 1 hour to give a yellow-green precipitate. The thus-formed yellow-green precipitate was collected by filtration, washed with distilled water and dried under vacuum to give 4.4 g of a green-orange compound (copper (II) complex with 2 molecules of 8-quinolinol) representable by the formula (3) shown below.

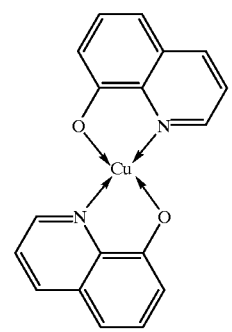

(3)

(2) Synthesis of poly(n-butyl acrylate)

A 100-ml Schlenk flask was purged with argon and then charged with 20 ml of toluene, followed by addition of 25 mg of the copper(II) complex with 2 molecules of 8-quinolinol as prepared above in (1) and 2 ml of a 10% solution of methylaluminoxane (product of Aldrich) in toluene. Then, 2.3 g of n-butyl acrylate was introduced into the flask and the polymerization was carried out at 0° C. for 24 hours. Thereafter, 30 ml of methanol was added to the reaction mixture to thereby terminate the reaction, the catalyst residue was removed, the reaction product was dissolved in chloroform, the solution was added to an excess of methanol, and the precipitate polymer was recovered, whereupon 2 g of poly(n-butyl acrylate) was obtained.

The poly(n-butyl acrylate) obtained was evaluated by GPC in the same manner as in Example 1. Tetrahydrofuran was used as the solvent for GPC. The polystyrene-equivalent weight average molecular weight and number average molecular weight were 80,100 and 57,000, respectively, and the ratio of weight average molecular weight to number average molecular weight (Mw/Mn), an index indicating the molecular weight distribution, was 1.41.

EXAMPLE 11

A 100-ml Schlenk flask was purged with argon and then charged with 7 ml of toluene, followed by addition of 12 mg of the copper(II) complex with 2 molecules of 8-quinolinol as prepared in Example 10 (1) and 2 ml of a 10% solution of methylaluminoxane (product of Aldrich) in toluene. Then, 1.3 g of methyl methacrylate was introduced into the flask and the polymerization was carried out at 30° C. for 24 hours. Thereafter, 30 ml of methanol was added to the reaction mixture to thereby terminate the reaction, the catalyst residue was removed, the reaction product was dissolved in chloroform, the solution was added to an excess of methanol, and the precipitate polymer was recovered, whereupon 0.75 g of poly(methyl methacrylate) was obtained.

The poly(methyl methacrylate) obtained was evaluated by GPC in the same manner as in Example 1. Tetrahydrofuran was used as the solvent for GPC. The polystyrene-equivalent weight average molecular weight and number average molecular weight were 19,800 and 15,200, respectively, and the ratio of weight average molecular weight to number average molecular weight (Mw/Mn), an index indicating the molecular weight distribution, was 1.30.

EXAMPLE 12

A 50-ml Schlenk flask was purged with argon and then charged with 34 ml of toluene, followed by addition of 10.8 mg of the copper(II) complex with 2 molecules of 8-quinolinol as prepared in Example 10 (1) and 0.5 ml of a 10% solution of methylaluminoxane (product of Aldrich) in toluene. Then, 3.9 g of n-butyl acrylate was introduced into the flask and the polymerization was carried out at 0° C. for 48 hours. Thereafter, 30 ml of methanol was added to the reaction mixture to thereby terminate the reaction, the catalyst residue was removed, the reaction product was dissolved in chloroform, the solution was added to an excess of methanol, and the precipitate polymer was recovered, whereupon 2.8 g of poly(n-butyl acrylate) was obtained.

The poly(n-butyl acrylate) obtained was evaluated by GPC in the same manner as in Example 1. Tetrahydrofuran was used as the solvent for GPC. The polystyrene-equivalent weight average molecular weight and number average molecular weight were 170,500 and 101,500, respectively, and the ratio of weight average molecular weight to number average molecular weight (Mw/Mn), an index indicating the molecular weight distribution, was 1.68.

EXAMPLE 13

(1) Synthesis of Copper Compounds

In the following, unless otherwise specified, dried and distilled reagents were used.

Synthesis of diimine copper(II) compound

To a argon-substituted 250-ml Schlenk flask having Dimroth condenser, 2.5 g of acenaphthenequinone, 1.85 g of anhydrous copper(II) chloride, and 150 ml of gracial acetic acid were added. After stirring the mixture for 30 minutes, 5.20 ml of 2,6-diisopropylaniline in a syringe was added dropwise to the mixture.

Then, the mixture was heated in an oil bath (the temperature of the bath was 120° C.) and refluxed. After two hours, the temperature of the system was returned to ordinary temperature. The resulting dark green crystals were filtered and recrystallized with toluene-methanol, and 6.96 g of the desired product, which is the diimine copper(II) compound represented by the formula (4) given below, was obtained. Identification was preformed by IR and elemental analysis.

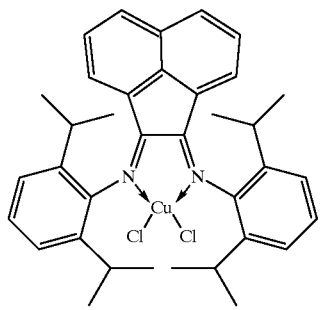

(4)

(2) Synthesis of Polyethylene

A 300-ml glass pressure vessel was purged with argon, and then followed by addition of 26 mg of the diimine copper(II) compound prepared as described in above (1), 2 ml of 20% solution of triisobutylaluminum (product of Tosoh-akzo) in toluene, 32.8 mg of N,N-dimethylanilinium tetra(pentafluorophenyl)borate, 120 mg of 2,6-di-t-butyl-4-methylphenol and 58 ml of dried toluene. Then, while introducing gaseous ethylene into the vessel and maintaining the system inside at 1.1 kg/cm$^2$ G, the polymerization was carried out at 0° C. for 4 hours. Thereafter, the reaction was terminated by adding 150 ml of methanol to the reaction solution, and the precipitated polymer was recovered, whereupon 0.9 g of polyethylene was obtained.

The polyethylene obtained was subjected to polymer analysis by gel permeation chromatography (GPC) and differential scanning calorimetry (DSC) o-Dichlorobenzene was used as the solvent for GPC. The weight average molecular weight was 490,000 and the number average molecular weight was 196,000, and the ratio of weight average molecular weight to number average molecular weight (Mw/Mn), an index indicating the molecular weight distribution, was thus 2.50. The melting curve obtained by DSC showed a peak, namely melting temperature, at 139° C. No melting peak was observed at 60° C. or below.

EXAMPLE 14

1.5 g of Polyethylene was obtained under the same conditions as in Example 13 except that a stainless pressure vessel was used and initial polymerization pressure was 10.0 kg/cm$^2$.

The polyethylene obtained was evaluated in the same manner as in Example 13. The weight average molecular weight was 320, 000 and the number average molecular weight was 140,000, and the ratio of weight average molecular weight to number average molecular weight (Mw/Mn), an index indicating the molecular weight distribution, was 2.29.

The melting curve obtained by DSC showed a peak, namely melting temperature, at 138° C. Like Example 13, no melting peak was observed at 60° C. or below.

EXAMPLE 15

(1) Synthesis of Polyethylene

A 300-ml glass pressure vessel was purged with argon, and then charged with 100 ml of toluene, followed by addition of 26 mg of the diimine copper (II) compound prepared as described in above (1) of Example 13, and 926 mg of methylaluminum di(tris 2,4,6-t-butylphenoxide), 2 ml of 20% solution of triisobutylaluminum (product of Tosoh-akzo) in toluene, 32.8 mg of N,N-dimethylanilinium tetra (pentafluorophenyl)borate, and 58 ml of dried toluene. Then, while introducing gaseous ethylene into the vessel and maintaining the system inside at 1.1 kg/cm² G, the polymerization was carried out at 0° C. for 4 hours. Thereafter, the reaction was terminated by adding 150 ml of methanol to the reaction solution, and the precipitated polymer was recovered, whereupon 0.9 g of polyethylene was obtained The polyethylene obtained was subjected to polymer analysis by gel permeation chromatography (GPC) and differential scanning calorimetry (DSC) o-Dichlorobenzene was used as the solvent for GPC. The weight average molecular weight was 540,000 and the number average molecular weight was 183,000, and the ratio of weight average molecular weight to number average molecular weight (Mw/Mn), an index indicating the molecular weight distribution, was thus 2 95. The melting curve obtained by DSC showed a peak, namely melting temperature, at 139° C. No melting peak was observed at 60° C. or below.

EXAMPLE 16

1.2 g of Polyethylene was obtained under the same conditions as in Example 15 except that a stainless pressure vessel was used and initial polymerization pressure was 10.0 kg/cm².

The polyethylene obtained was evaluated in the same manner as in Example 15. The weight average molecular weight was 610,000 and the number average molecular weight was 230,000, and the ratio of weight average molecular weight to number average molecular weight (Mw/Mn), an index indicating the molecular weight distribution, was 2.65.

The melting curve obtained by DSC showed a peak, namely melting temperature, at 138° C. Like Example 15, no melting peak was observed at 60° C. or below.

Industrial Applicability

The method of producing a polymer using a copper compound in accordance with the present invention, which has the constitution mentioned above, uses a copper catalyst, which is excellent in stability, easy to handle and inexpensive, as a polymerization catalyst and thus provides a polymer narrow in molecular weight distribution with ease and at low cost.

What is claim is:

1. A method of producing a polymer which comprises using a copper compound represented by the general formula LCuXna or L(L')CuXnb wherein L and L' each represents a N-coordination compounds selected from the group consisting of bisoxazoline, substituted bisoxazoline, an amidine compound and a diimine represented by the general formula $R^3N=CR^4CR^5=NR^6$ wherein $R^3$, $R^4$, $R^5$ and $R^6$ each represents independently an alkyl, allyl, an aryl, a hydrogen atom, or a halogen atom; or at least one group of $R^3$ and $R^4$, $R^4$ and $R^5$ and $R^6$ is combined and represents a cyclic group with the next carbon and/or nitrogen atom, or a O— and N— coordination compound; X represents a halogen atom or an alkoxy, thioxy, allyloxy, amino, secondary amino, tertiary amino, cyano, nitro, alkyl or allyl group; na represents an integer of 1 to 2; and nb represents an integer of 0 to 2 as a catalyst and/or polymerization initiator in polymerizing a vinyl monomer whose polarity value e, when expressed in terms of absolute value, is not more than 1.5.

2. A method of producing a polymer which comprises using a copper compound represented by the general formula LCuXna or L(L')CuXnb wherein L and L' each represents a N-coordination compound selected from the group consisting of bisoxazoline, substituted bisoxazoline, an amidine compound and a diimine represented by the general formula $R^3N=CR^4CR^5=NR^6$ wherein $R^3,R^4,R^5$ and $R^6$ each represents independently and alkyl, allyl, an aryl, a hydrogen atom, or a halogen atom; or at least one group of $R^3$ and $R^4$, $R^4$ and $R^5$, and $R^5$ and $R^6$ is combined and represents a cyclic group with the next carbon and/or nitrogen atom, or a O— and N— coordination compound; X represents a halogen atom or an alkoxy, thioxy, allyloxy, amino, secondary amino, tertiary amino, cyano, nitro, alkyl or allyl group; na represents an integer of 1 to 2; and nb represents an integer of 0 to 2 as a catalyst and/or polymerization initiator in polymerizing a compound capable of polymerizing by a ring-opening reaction.

3. The method of producing a polymer using a copper compound according to claim 1, wherein the copper compound is used together with one or more organometallic compounds selected from the group consisting of aluminoxanes, organoaluminum compounds represented by the general formula $AlR_mZ_{3-m}$ wherein R represents a hydrocarbon group containing 1 to 20 carbon atoms, Z represents a hydrogen or halogen atom or an alkoxy, allyloxy ro siloxy group, and m is an integer of 0 to 3, boron-containing Lewis acids and boron-containing ionic compounds.

4. The method of producing a polymer using a copper compound according to claim 1, wherein the vinyl monomer is an α-substituted olefin.

5. The method of producing a polymer using a copper compound according to claim 1, wherein the vinyl monomer is a (meth)acrylic ester.

6. The method of producing a polymer using a copper compound according to claim 2, wherein the compound capable of polymerizing by a ring-opening reaction is a lactone.

7. The method of producing a polymer using a copper compound according to claim 1, wherein at least one of L and L' in the copper compound represented by the general formula LCuXna or L(L')CuXnb is the N-coordination compound.

8. The method of producing a polymer using a copper compound according to claim 7, wherein the N-coordination compound is the amidine compound.

9. The method of producing a polymer using a copper compound according to claim 8, wherein the amidine compound is N,N'-dimethylamidine, N,N'-diethylamidine, N,N'-diisopropylamidine, N,N'-di-t-butylamidine, N,N'-ditrifluoromethylamidine, N—N'-diphenylamidine, N,N'-di-substituted phenylamidine, N,N'-ditrimethylsilylamidine, N,N'-dimethylbenzamidine, N,N'-diethylbenzamidine, N,N'-diisopropylbenzamidine, N,N'-di-t-butylbenzamidine, N,N'-ditrifluoromethylbenzamidine, N,N'-diphenylbenzamidine, N,N'-ditrimethylsilylbenzamidine, or N,N'-di-substituted phenylbenzamidine.

10. The method of producing a polymer using a copper compound according to claim 9, wherein the amidine compound is N,N'-ditrimethylsilylbenzamidine.

11. The method of producing a polymer using a copper compound according to claim 7, wherein the N-coordination compound is the diimine represented by the general formula $R^3N=CR^4CR^5=NR^6$ wherein $R^3$, $R^4$, $R^5$ and $R^6$ each represents independently an alkyl, allyl, an aryl, a hydrogen atom, or a halogen atom; or at least one group of $R^3$ and $R^4$, $R^4$ and $R^5$, and $R^5$ and $R^6$ is combined and represents a cyclic group with the next carbon and/or nitrogen atom.

12. The method of producing a polymer using a copper compound according to claim 11, wherein the diimine is represented by the general formula $R^3N=CR^4CR^5=NR^6$ wherein each $R^3$ and $R^6$ is an aryl, each $R^4$ and $R^5$ is a hydrogen atom, a halogen atom, an alkyl, allyl, or an aryl; or $R^4 R^5$ are combined and represents a cyclic hydrocarbon with the next carbon atoms.

13. The method of producing a polymer using a copper compound according to claim 1, wherein at least one of L and L' in the copper compound represented by the general formula LCuXna or L(L')CuXnb is the O- and N-coordination compound.

14. The method of producing a polymer using a copper compound according to claim 13, wherein the O- and N-coordination compound is 8-quinolinol or substituted 8-quinolinol.

15. The method of producing a polymer using a copper compound according to claim 2, wherein the copper compound is used together with one or more organometallic compounds selected from the group consisting of aluminoxanes, organoaluminum compounds represented by the general formula $AlR_mZ_{3-m}$ wherein R represents a hydrocarbons group containing 1 to 20 carbon atoms, Z represents a hydrogen or halogen atom or an alkoxy, allyloxy or siloxy group, and m is an integer of 0 to 3, boron-containing Lewis acids and boron-containing ionic compounds.

16. The method of producing a polymer using a copper compound according to claim 2, wherein at least one of L and L' in the copper compound represented by the gereral formula LCuXna or L(L')CuXnb is the N-coordination compound.

17. The method of producing a polymer using a copper compound according to claim 2, wherein at least one of L and L' in the copper compound represented by the general formula LCuXna or L(L')CuXnb is the O⁻ and N⁻ coordination compound.

18. the method of producing a polymer using a copper compound according to claim 1, wherein in the general formula LCuXna and L(L')CuXnb, L and L' each represents a N-coordination compound selected from the group consisting of an amidine compound and a diimine represented by the general formula $R^3N=CR^4CR^5=NR^6$ wherein $R^3$, $R^4$, $R^5$ and $R^6$ each represents independently an alkyl, allyl, an aryl, a hydrogen atom, or a halogen atom; or at least one group of $R^3$ and $R^4$, $R^4$ and $R^5$, and $R^5$ and $R^6$ is combined and represents a cyclic group with the next carbon and/or nitrogen atom, or a O- and N-coordination compound; X represents a halogen atom or an alkoxy, thioxy, allyloxy, amino, secondary amino, tertiary amino, cyano, nitro, alkyl or allyl group; na represents an integer of 1 to 2; and nb represents an integer of 0 to 2.

19. The method of producing a polymer using a copper compound according to claim 2, wherein in the general formula LCuXna and L(L')CuXnb, L and L' each represents a N-coordination compound selected from the group consisting of an amidine compound and a diimine represented by the general formula $R^3N=CR^4CR^5=NR^6$ wherein $R^3$, $R^4$, $R^5$ and $R^6$ each represents independently an alkyl, allyl, an aryl, a hydrogen atom, or a halogen atom; or at least one group of $R^3$ and $R^4$, $R^4$ and $R^5$, and $R^5$ and $R^6$ is combined and represents a cyclic group with the next carbon and/or nitrogen atom, or a O- and N-coordination compound; X represents a halogen atom or an alkoxy, thioxy, allyloxy, amino, secondary amino, tertiary amino, cyano, nitro, alkyl or allyl group; na represents an integer of 1 to 2; and nb represents an integer of 0 to 2.

* * * * *

UNITED STATES PATENT AND TRADEMARK OFFICE
CERTIFICATE OF CORRECTION

PATENT NO.    : 6,433,130 B1
DATED         : August 13, 2002
INVENTOR(S)   : Shibayama et al.

It is certified that error appears in the above-identified patent and that said Letters Patent is hereby corrected as shown below:

Column 17,
Line 49, change "resents a N-coordination compounds selected from the", to
-- resents a N-coordination compound selected from the --
Line 55, change "of $R^3$ and $R^4$, $R^4$ and $R^5$ and $R^6$ is combined and represents" to
-- of $R^3$ and $R^4$, $R^4$ and $R^5$ and $R^5$ and $R^6$ is combined and represents --

Column 18,
Line 5, change "each represents independently and alkyl, allyl, an aryl, a", to
-- each represents independently an alkly, allyl, an aryl, a --
Line 48, change "ditrifluoromethylamidine N—N'-diphenylamidine, N,N'-di-" to
-- ditrifluoromethylamidine N,N'-diphenylamidine, N,N'-di- --

Signed and Sealed this

Sixth Day of May, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,433,130 B1  Page 1 of 1
DATED : August 13, 2002
INVENTOR(S) : Shibayama et al.

It is certified that error appears in the above-identified patent and that said Letters Patent is hereby corrected as shown below:

Column 18,
Line 48, change "ditrifluoromethylamidine N—N'-diphenylamidine, N,N'-di-"
to -- ditrifluoromethylamidine, N,N'-diphenylamidine, N,N'-di- --

Signed and Sealed this

Sixth Day of January, 2004

JAMES E. ROGAN
*Director of the United States Patent and Trademark Office*